United States Patent
Robertson et al.

(10) Patent No.: US 12,434,620 B1
(45) Date of Patent: Oct. 7, 2025

(54) BIASING MEMBER FOR HEADLAMP AIMING SYSTEM

(71) Applicant: Ford Global Technologies, LLC, Dearborn, MI (US)

(72) Inventors: Michael Robertson, West Bloomfield, MI (US); Venkatesh Krishnan, Canton, MI (US); Michael Bryan VanBelle, Canton, MI (US); Evan Gage, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/630,065

(22) Filed: Apr. 9, 2024

(51) Int. Cl.
*B60Q 1/076* (2006.01)
*B60Q 1/068* (2006.01)

(52) U.S. Cl.
CPC .......... *B60Q 1/076* (2013.01); *B60Q 1/0683* (2013.01); *B60Q 2200/34* (2013.01)

(58) Field of Classification Search
CPC ........ B60Q 1/08; B60Q 2200/34; B60Q 1/06; B60Q 1/064; B60Q 1/068; B60Q 1/0683; B60Q 1/0686; B60Q 1/07; B60Q 1/072; B60Q 1/076
See application file for complete search history.

(56) References Cited

U.S. PATENT DOCUMENTS

| | | | |
|---|---|---|---|
| 5,331,519 A | * | 7/1994 | Fujino ................. B60Q 1/0683 362/528 |
| 5,622,421 A | | 4/1997 | Turley, Jr. et al. |
| 6,257,747 B1 | | 7/2001 | Burton |
| 6,550,948 B1 | | 4/2003 | Filburn et al. |
| 6,913,374 B2 | | 7/2005 | Burton |
| 2001/0046140 A1 | | 11/2001 | Chase et al. |
| 2005/0262954 A1 | | 12/2005 | Eto et al. |
| 2007/0127254 A1 | * | 6/2007 | Chen .................... B60Q 1/0683 362/512 |
| 2020/0114804 A1 | * | 4/2020 | Fladhammer ......... F21S 41/675 |

FOREIGN PATENT DOCUMENTS

| | | |
|---|---|---|
| CN | 108263486 A | 7/2018 |
| CN | 108263487 A | 7/2018 |
| CN | 207826088 U | 9/2018 |
| DE | 102011003910 A1 | 8/2012 |
| DE | 102011003908 B4 | 4/2019 |

* cited by examiner

*Primary Examiner* — Robert J May
(74) *Attorney, Agent, or Firm* — Vichit Chea; Carlson, Gaskey & Olds, P.C.

(57) ABSTRACT

A method and system include a housing, a vehicle lamp assembly that is supported by the housing, and a motor sled that is supported for movement relative to the housing. An adjustment member is coupled to the motor sled, and the motor sled is moveable by the adjustment member to adjust an aim of the vehicle lamp assembly. A biasing member reacts between the motor sled and the housing to provide a pre-load.

22 Claims, 9 Drawing Sheets

BIASING MEMBER FOR HEADLAMP AIMING SYSTEM

TECHNICAL FIELD

This disclosure relates generally to a headlamp aiming method and system that uses a biasing member to stabilize headlamp components and maintain tolerances and clearance to prevent binding and maintain aim.

BACKGROUND

Vehicles include many different types of lamp assemblies, such as headlamps for example. These lamps are adjusted during assembly of the vehicle to ensure that the aim of the lamps is within a specified target range. Tolerance stack-ups and clearance issues can affect aiming stability and capability.

SUMMARY

An assembly according to an exemplary aspect of the present disclosure includes, among other things: a housing; a vehicle lamp assembly supported by the housing; a motor sled supported for movement relative to the housing; an adjustment member coupled to the motor sled, wherein the motor sled is moveable by the adjustment member to adjust an aim of the vehicle lamp assembly; and a biasing member reacting between the motor sled and the housing.

In a further non-limiting embodiment of the foregoing assembly, the biasing member generates a preload force to bias the motor sled away from the housing.

In a further non-limiting embodiment of any of the foregoing assemblies, the biasing member comprises a coil spring.

In a further non-limiting embodiment of any of the foregoing assemblies, the motor sled comprises a main body with a first arm extending outwardly of the main body to provide a first spring base, and wherein the housing includes a second arm extending outwardly of the housing toward the first arm to provide a second spring base.

In a further non-limiting embodiment of any of the foregoing assemblies, a first mounting tab is fixed to the motor sled and a second mounting tab is fixed to the housing, and wherein the coil spring includes a first spring end fixed to the first mounting tab and a second spring end fixed to the second mounting tab.

In a further non-limiting embodiment of any of the foregoing assemblies, the biasing member comprises a flex arm.

In a further non-limiting embodiment of any of the foregoing assemblies, the flex arm extends from one end fixed to the motor sled to a distal end that abuts against the housing.

In a further non-limiting embodiment of any of the foregoing assemblies, the housing includes a guide channel that receives a portion of the motor sled, and wherein the distal end abuts directly against an open end face of the guide channel.

In a further non-limiting embodiment of any of the foregoing assemblies, a mounting tab is fixed to the housing, and wherein the flex arm extends from one end fixed to the mounting tab to a distal end that abuts against an end face of the motor sled.

In a further non-limiting embodiment of any of the foregoing assemblies, the adjustment member comprises a drive screw that is coupled to the motor sled which is associated with a motor.

In a further non-limiting embodiment of any of the foregoing assemblies, the motor sled comprises a main body with a first arm extending outwardly of the main body to engage the drive screw, a slider portion extending along an edge of the main body to move within a guide channel formed within the housing, and a motor mount portion that is coupled to the motor.

In a further non-limiting embodiment of any of the foregoing assemblies, the motor sled includes a first interface and the housing includes a second interface, and wherein the biasing member extends from a first end associated with the first interface to a second end associated with the second interface.

In a further non-limiting embodiment of any of the foregoing assemblies, the biasing member comprises a spring.

In a further non-limiting embodiment of any of the foregoing assemblies, the biasing member comprises a flex arm.

A method according to an exemplary aspect of the present disclosure includes, among other things: supporting a vehicle lamp assembly with a housing; supporting a motor sled for movement relative to the housing; coupling an adjustment member coupled to the motor sled, wherein the motor sled is moveable by the adjustment member to adjust an aim of the vehicle lamp assembly; and installing a biasing member to react between the motor sled and the housing.

In a further non-limiting embodiment of the foregoing method, the method includes generating a preload force with the biasing member to bias the motor sled away from the housing.

In a further non-limiting embodiment of any of the foregoing methods, the method includes forming the motor sled to comprise a main body with a first arm extending outwardly of the main body to engage the adjustment member, a slider portion extending along an edge of the main body to move within a guide channel formed within the housing, and a motor mount portion that is coupled to a motor.

In a further non-limiting embodiment of any of the foregoing methods, the method includes providing the motor sled with a first interface and the housing with a second interface, and extending the biasing member from a first end associated with the first interface to a second end associated with the second interface.

In a further non-limiting embodiment of any of the foregoing methods, the biasing member comprises a spring.

In a further non-limiting embodiment of any of the foregoing methods, the biasing member comprises a flex arm.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a headlamp aiming method and system that uses a biasing member to stabilize headlamp components and maintain tolerances and clearance to prevent binding and maintain aim. These and other features are discussed in greater detail in the following paragraphs of this detailed description.

Figure 1:
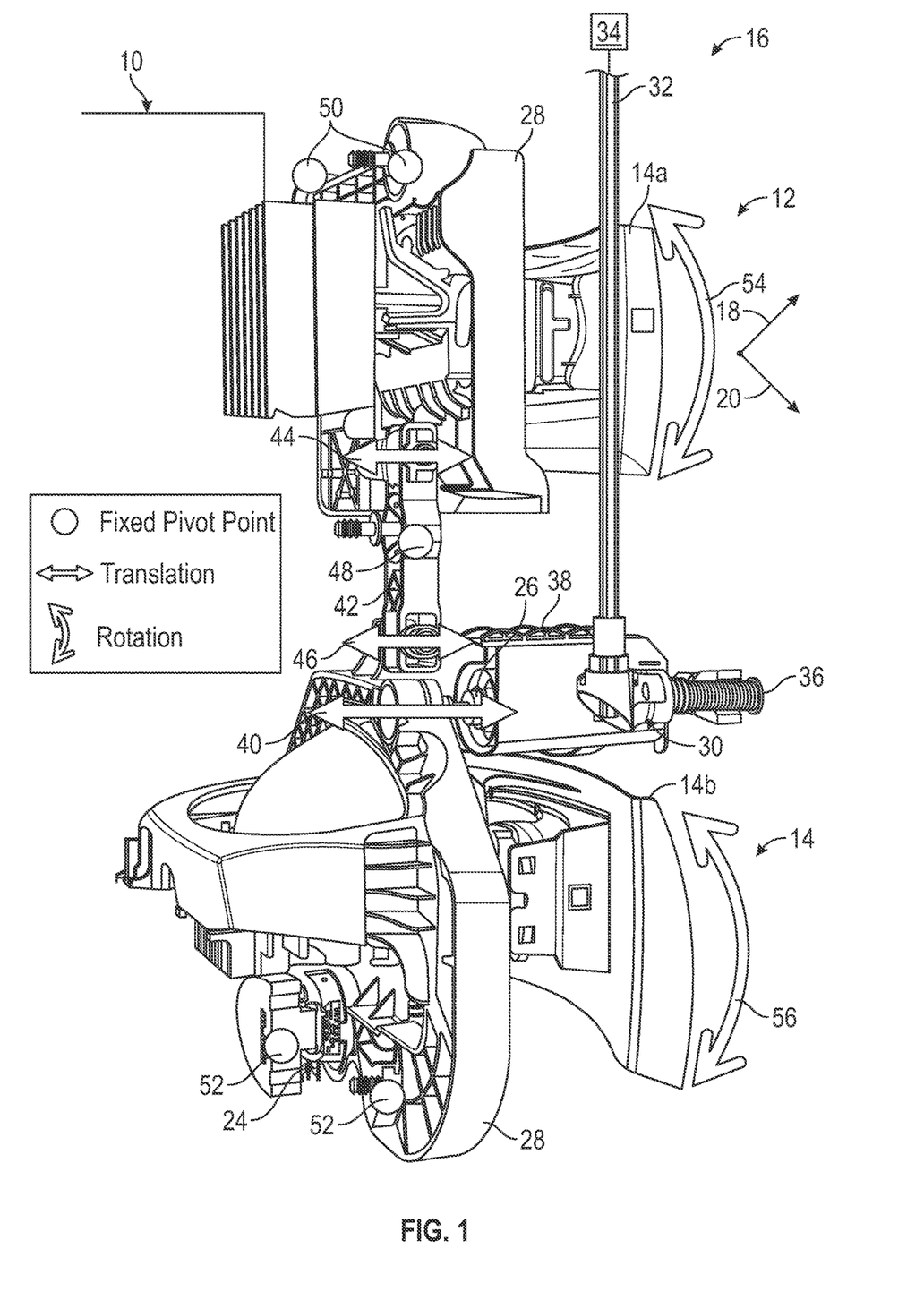
FIG. 1 is a rear perspective view of a headlamp assembly.

FIG. 1 illustrates a vehicle 10 that includes a vehicle lamp assembly 12 including a lamp component 14, which is moved via an adjustment mechanism 16 to adjust an aim of the vehicle lamp assembly 12. For example, the adjustment mechanism 16 can adjust the aim up 18 or down 20. In this example, the vehicle lamp assembly 12 comprises a headlamp assembly; however, the subject system and aiming method could also be used with other types of lamp assemblies. In one example, the lamp assembly 12 includes an upper headlamp component 14a and a lower headlamp component 14b.

In one example, internal mechanisms to the lamp assembly 12 may include a horizontal motor 24 that is used to provide swiveling movement, e.g., right to left swiveling, of the lamp assembly 12 as the vehicle goes through turns. A vertical motor 26 may also be included to provide auto-leveling of the lamp assembly 12 during vehicle operation based on pitch. A bracket assembly 28 is used to mount the horizontal motor 24 and the vertical motor 26 on a vehicle structure.

In one example, a system for adjusting the lamp assembly 12 includes an adjuster 30 coupled to an input drive rod 32, which is coupled to the adjustment mechanism 16, which comprises, for example, an adjusting tool 34. In one example, the adjusting tool 34 comprises an automated tool that provides rotating drive input to the drive rod 32. Those skilled in the art who have the benefit of this description will be able to determine the type of automated tool that would be applied for these purposes. In one example, the adjuster 30 comprises a 90 degree geared screw adjuster that includes a drive screw 36. The drive screw 36 is coupled to a moveable motor sled 38, which is associated with the vertical motor 26 and moves in translation as indicated by arrow 40.

The lamp assembly 12 also includes a connecting rod 42 that connects the upper lamp component 14a and the lower lamp component 14b together. The connecting rod 42 is used to translate movement of the lower lamp component 14b to the upper lamp component 14a. The connecting rod 42 moves in translation at opposing ends, as indicated by arrows 44, 46, and pivots about fixed pivot point 48. Other fixed pivot points for the lamp assembly 12 include upper pivot points 50 and lower pivot points 52. The upper lamp component 14a can be rotated as indicated at 54 and the lower lamp component 14b can be rotated as indicated at 56.

As known, per headlamp requirements and performance needs, all vehicle headlamps require an aiming system to aim the headlamps to be within a defined tolerance range. This is achieved through moving mechanisms internal to the headlamp. As discussed above, these mechanisms have many moving parts and can be complex. During aiming, these mechanisms have tolerances that shift, and can flex, bind-up, and create tension in the system. As a result, external forces such as hood slam, road bumps, vibration inputs, and thermal loads, for example, may cause the initially preset aim to change, e.g., move out of the defined factory set tolerance range. It is known that even very small movements of internal components of the lamp assembly associated with aiming can result in large changes of overall headlamp beam aim. For example, a 0.46 mm (0.02 inches) shift in a position of the motor sled 38 results in a shift of 25.4 mm (1 inch) aim at 25 feet, which is a typical distance at which the aim requirements are set. The subject disclosure provides a system and aiming method that utilizes a biasing member to pre-load moveable components within the headlamp assembly to maintain aim stability and capability over time.

Figure 3:
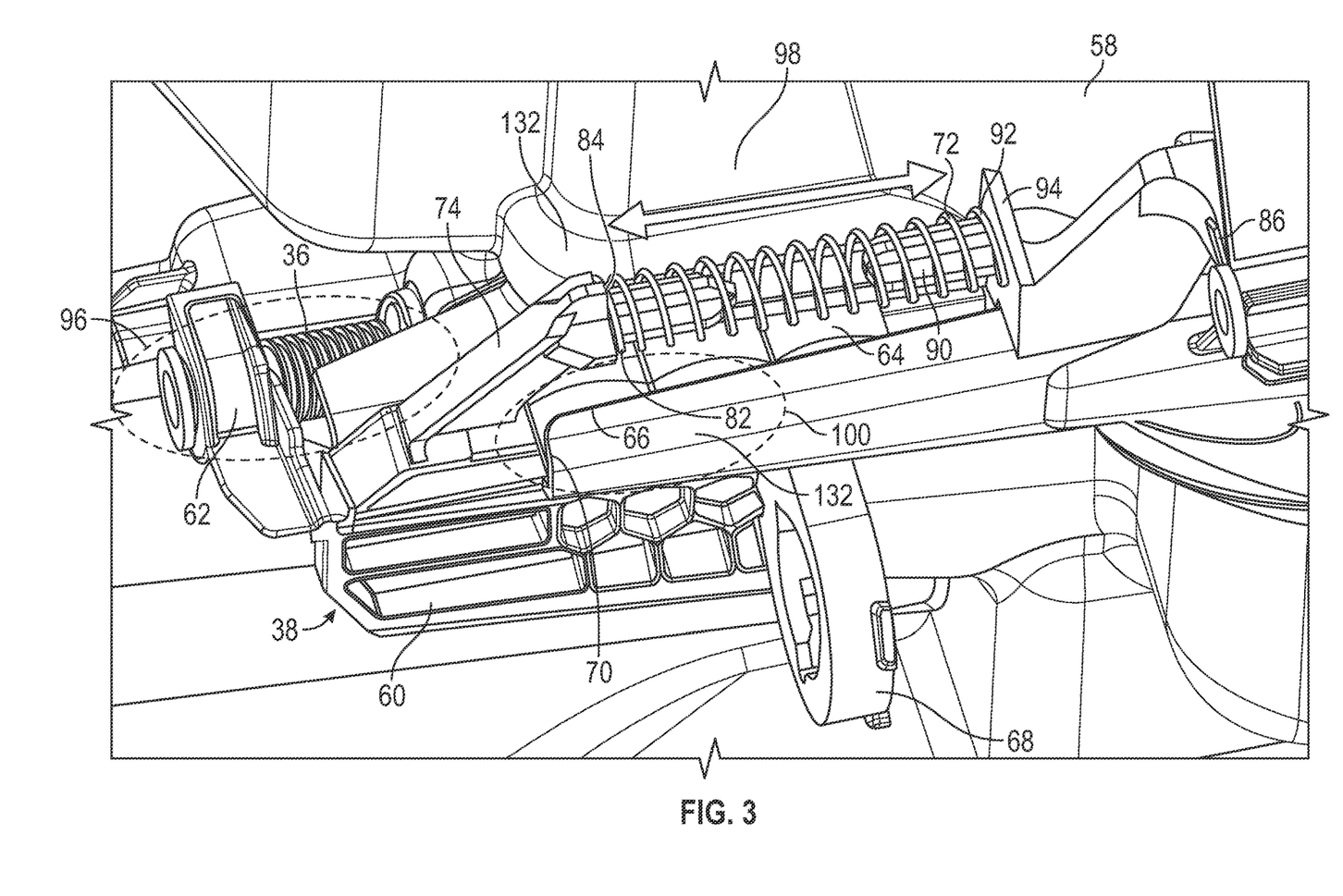
FIG. 3 is a perspective view of the biasing member of FIG. 2 as assembled.

In one example, the vehicle lamp assembly 12 is supported within a housing 58 (FIG. 3). The housing 58 can be used to support multiple different components of the vehicle lamp assembly 12. The housing 58 can be fixed to a vehicle structure such as a frame or body member (not shown), for example.

Figure 2:
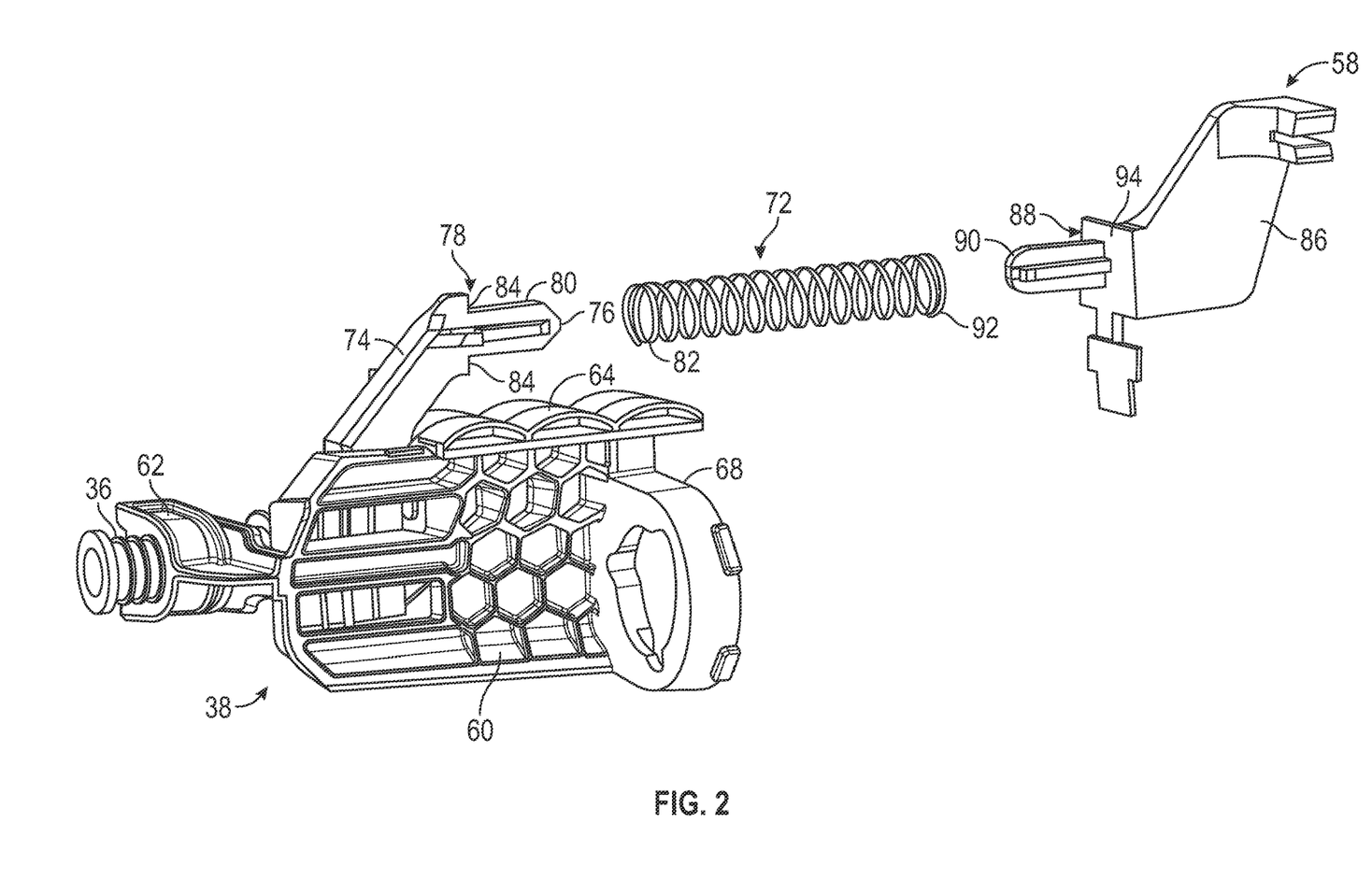
FIG. 2 is an exploded view of one example of a biasing member.

In one example shown in FIG. 2, the motor sled 38 comprises a main body 60 with a first arm 62 extending outwardly of the main body 60 to engage the drive screw 36. In one example, the main body 60 comprises a ribbed structure. A slider portion 64 extends along an edge of the main body 60 to move within a guide channel 66 formed within the housing 58. A motor mount portion 68 is coupled to the motor 26. In one example, the first arm 62 extends outwardly from one side of the main body 60 and the motor mount portion 68 extends outwardly of an opposite side of the main body 60. In one example, the slider portion 64 extends along an upper edge of the main body 60 and includes side edges that are received within the guide channel 66.

In one example, the guide channel 66 is open at one end 70 to receive the slider portion 64. The slider portion 64 translates along a linear path to adjust a position of the motor sled 38 and associated motor 26.

Figure 4A:
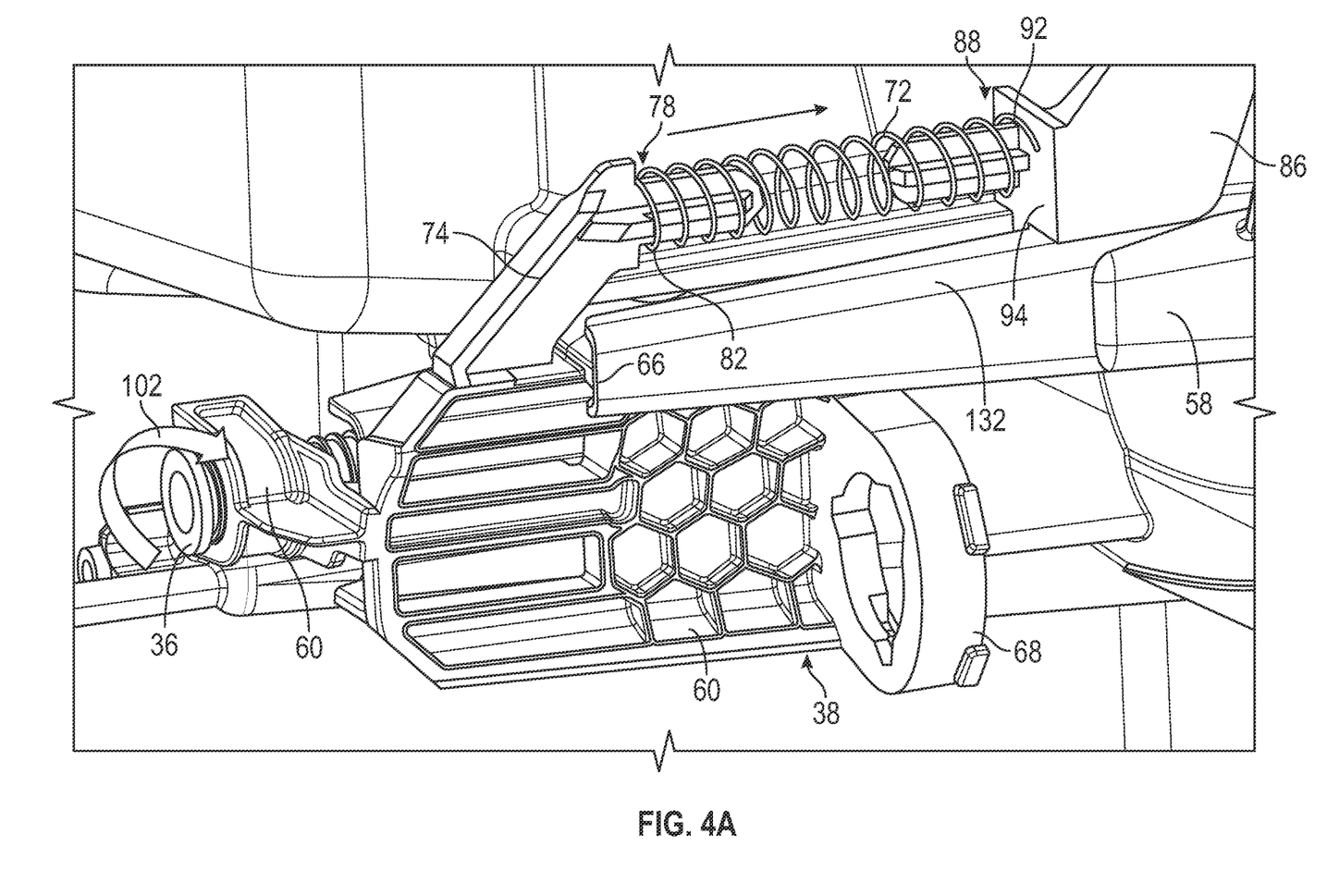
FIG. 4A is a perspective view of the biasing member of FIG. 2 in a first adjustment position.
Figure 4B:
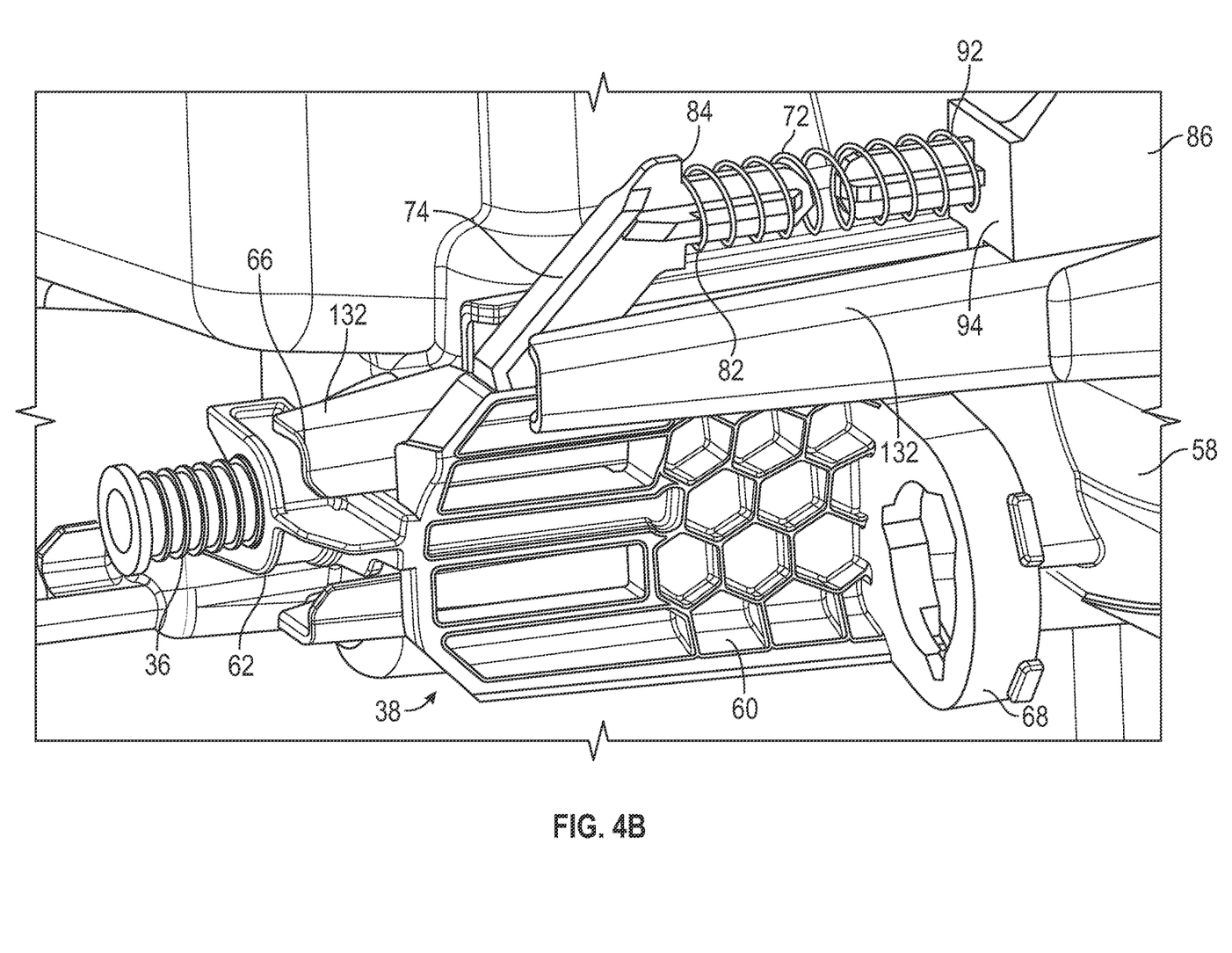
FIG. 4B is a perspective view of the biasing member of FIG. 2 in a second adjustment position.

As shown in FIGS. 3 and 4A-4B, the arm 62 of the motor sled 38 is coupled to the drive screw 36, which rotates about an axis of rotation. In one example, the arm 62 has a threaded interface connection to the drive screw 36. In one example, the arm 62 moves the motor sled 38 along a guide channel 66 during adjustment to the aiming target range. The input drive rod 32, which is coupled to the adjusting tool 34, is used to rotate the drive screw 36 via the geared screw adjuster 30 to provide adjustment. During adjustment, the drive screw 36 rotates about the axis of rotation to drive the arm 62 along a linear translation path to adjust a position of the motor sled 38 until a predefined nominal aim target is reached.

Due to aiming system tolerance stack-ups and external factors, e.g., hood slam, rough roads, thermal cycling, etc., the movement of the aim may be affected leading to aim stability and capability issues. The subject disclosure adds pre-load into the system to shift variation to other moving parts, e.g., shift to a smaller tolerance zone, to stabilize them.

The other moving parts can maintain necessary tolerances and clearance to prevent binding.

FIG. 2 shows one example of an assembly that provides the desired pre-load. In this example, a biasing member 72 reacts between the motor sled 38 and the housing 58. The biasing member 72 generates a preload force to bias the motor sled 38 away from the housing 58, i.e., in a direction to the left in FIG. 3. In one example, the biasing member 72 comprises a coil spring.

In this example, the main body 60 of the motor sled 38 includes a second arm 74 extending outwardly of the main body 60. In one example, the second arm 74 is adjacent to the slider portion 64 and extends away from a top edge of the main body 60. In one example, the second arm 74 extends to a distal end 76 and provides a first spring base 78. The distal end 76 comprises a reduced section portion 80 which is surrounded by a first end 82 of the biasing member 72. One or more abutment surfaces 84 extend outwardly from the reduced section portion 80 to provide the first spring base 78.

In this example, the housing 58 includes an arm 86 extending outwardly of the housing 58 toward the second arm 74 to provide a second spring base 88. The arm 86 can comprise a separately attached piece or can be integrally formed with the housing 58. A distal end 90 of the arm 86 comprises a reduced section portion which is surrounded by a second end 92 of the biasing member 72. One or more abutment surfaces 94 extend around the reduced section portion of the distal end 90 to provide the second spring base 88.

Compression of the biasing member 72 adds pre-load onto the moving motor sled 38 as indicated at 98 in FIG. 3. The pre-load generated by the biasing member 72 closes any gap in any tolerances in the screw adjuster and threads associated with the drive screw 36 as shown at 96 The pre-load also closes the gap in any tolerances in sled interface to the main housing 58 as shown at 100.

FIG. 4A is a perspective view of the biasing member 72 of FIG. 2 in a first adjustment position. When the drive screw 36 is rotated, as indicated at 102, the motor sled 38 moves back and forth (depending upon direction of rotation) within the guide channel 66 to aim the headlamp beam pattern. When the drive screw 36 is rotated to move the motor sled 38 to the left as shown in FIG. 4B, the biasing member 72 is further compressed.

Figure 5:
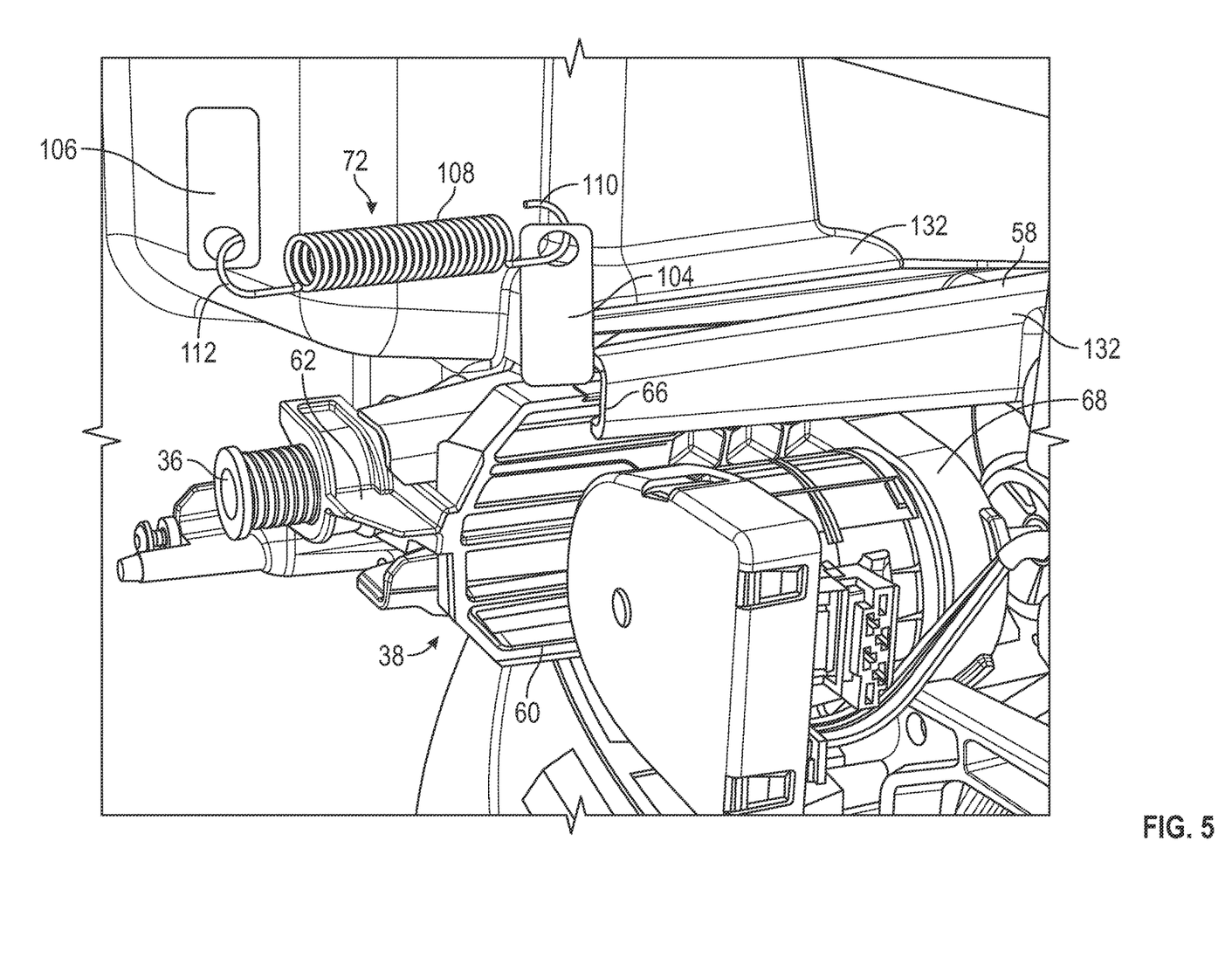
FIG. 5 is a perspective view of another example of a biasing member.

FIG. 5 shows another example of a biasing member 72 comprising a spring that provides a pre-load force between the housing 58 and sled 38. In this example, there is a first mounting tab 104 fixed to the motor sled 38 and a second mounting tab 106 fixed to the housing 58. The biasing member 72 comprises a coil spring 108 that has a first spring end 110 fixed to the first mounting tab 104 and a second spring end 112 fixed to the second mounting tab 106. In one example, the mounting tabs 104, 106 can comprise metal plates with pins that are coupled to the spring ends 110, 112.

Figure 6A:
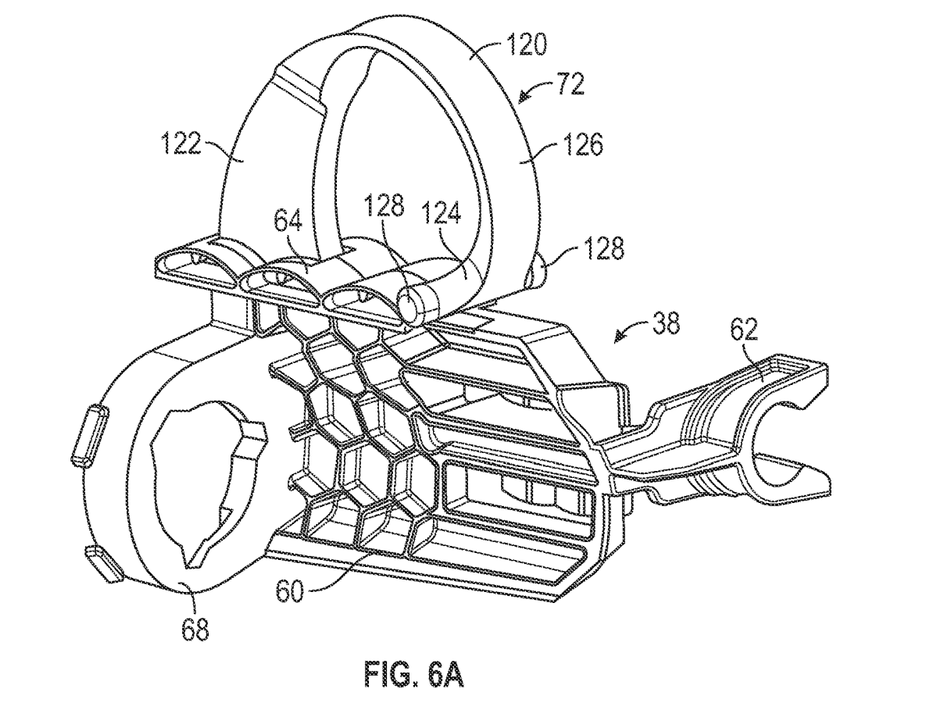
FIG. 6A is a perspective view of another example of a biasing member.
Figure 6B:
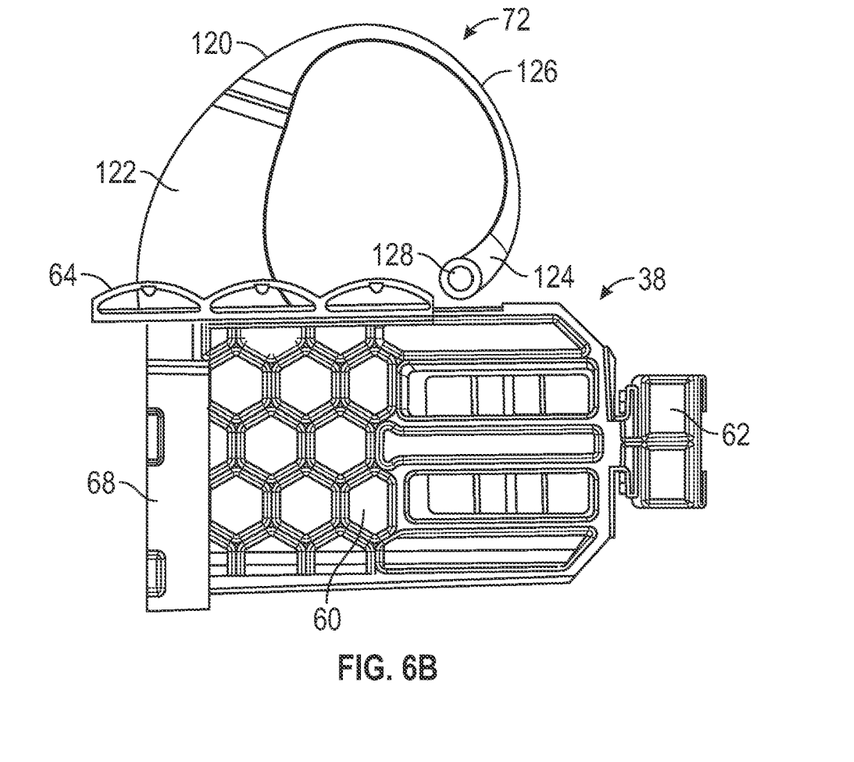
FIG. 6B is a side view of the biasing member of FIG. 6A.
Figure 7:
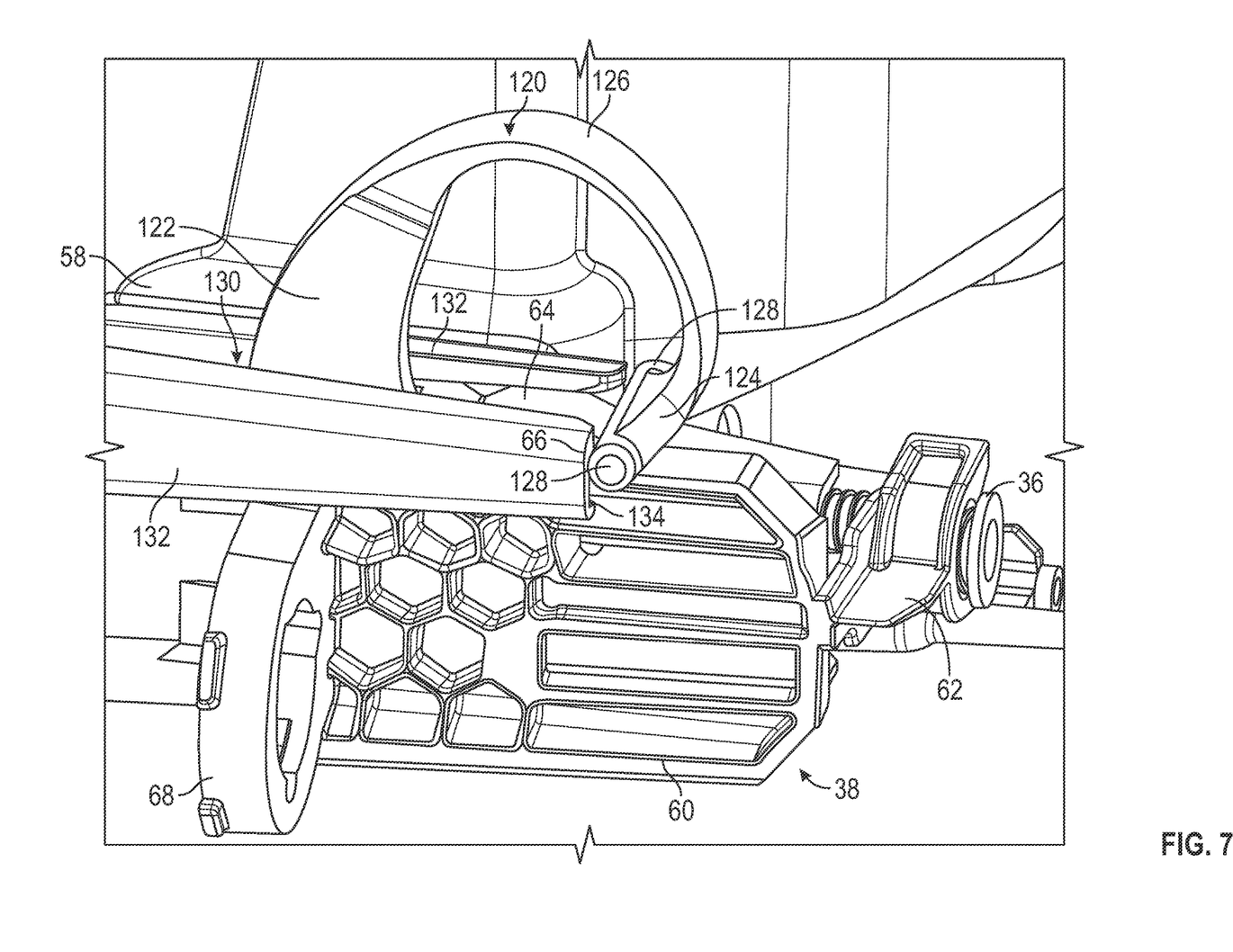
FIG. 7 is a perspective view of the biasing member of FIG. 6A as installed in a housing.

FIGS. 6A-6B shows another example of a biasing member 72. In this example, the biasing member comprises a flex arm 120 that provides the pre-load. The flex arm 120 applies spring tension as the arm flexes. The flex arm 120 extends from one end 122 fixed to the motor sled 38 to a distal end 124 that abuts against the housing 5 as shown in FIG. 7. In this example, the one end 122 of the flex arm 120 extends outward from a top edge of the main body 60 of the motor sled 38 within the slider portion 64. The main body 60 of the motor sled 38 comprises the first arm 62, the slider portion 64, and the motor mount portion 68 as described above.

In one example, the flex arm 120 first extends upwardly away from the top edge of the main body 60 and then includes a center portion 126 that curves downward back toward the top edge to the distal end 124 to form a C-shape. In one example, the flex arm 120 has a larger cross-section at the one end 122 than at the center portion 126. In one example, the distal end 124 includes opposing extensions 128 that contact the housing 58 and form a T-shape.

In one example, the slider portion 64 of the motor sled 38 is received within the guide channel 66 and the one end 122 of the flex arm 120 extends outward of a gap 130 formed between opposing rails 132 of the guide channel 66. The flex arm 120 curves back toward the open end 70 of the guide channel 66 and the extensions 128 of the distal end 124 abut directly against an end face 134 of the guide channel 66. As the adjustments are made using the drive screw 36, the flex arm 120 rides against the housing 58 and flexes with movement of the motor sled 38, applying tension in the system like the prior configuration with the spring.

In one example, the one end 122 of the flex arm 120 is integrally attached to the main body 60 of the motor sled 38. The flex arm 120 could also be separately attached to the motor sled 38. The geometry and the thickness, e.g. cross-section, of the flex arm 120 can be tuned based on testing specific to each lamp assembly 12 to apply a sufficient amount of pre-load in the aiming system without binding it or making tool input forces too high.

Figure 8:
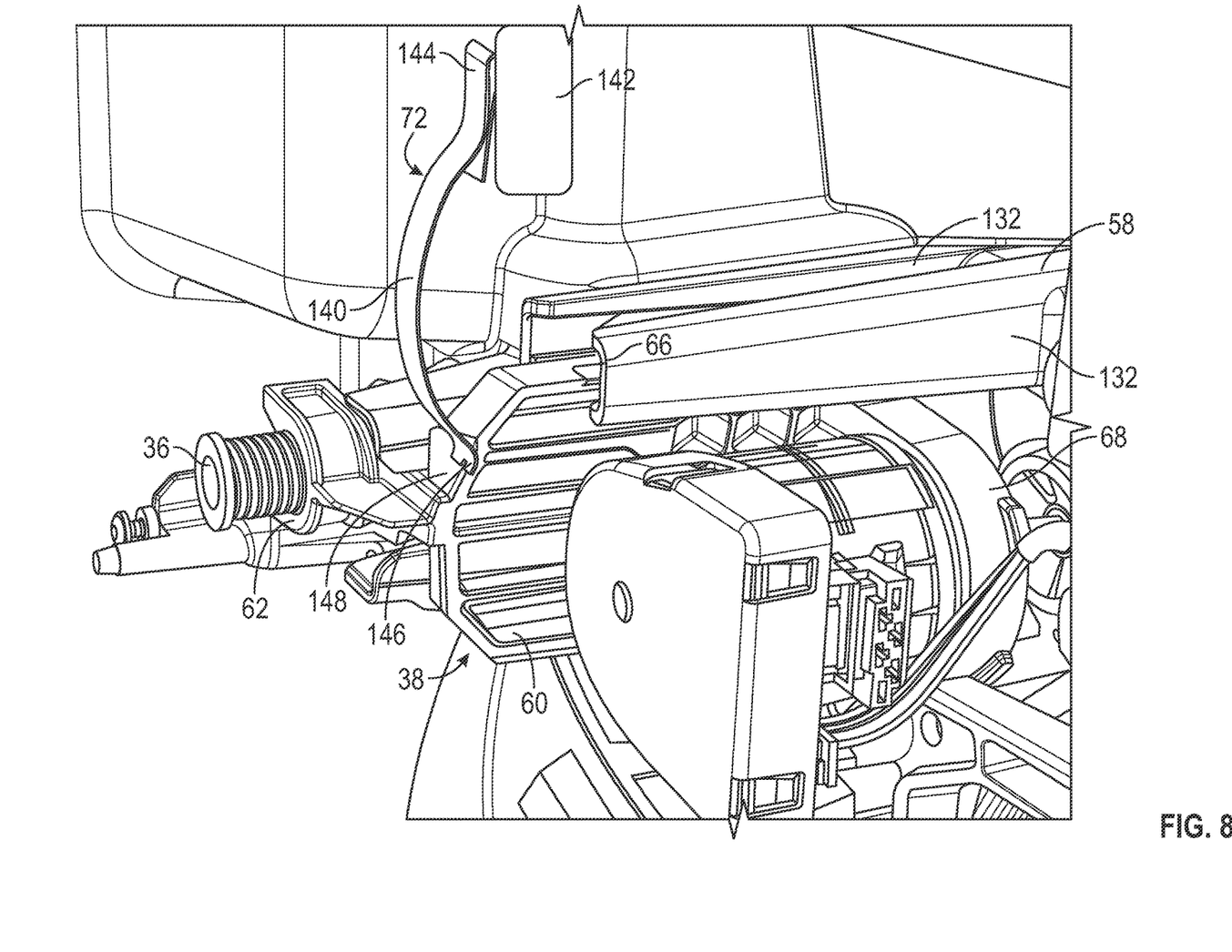
FIG. 8 is a perspective view of another example of a biasing member.

FIG. 8 shows another example of a biasing member 72 comprising a flex arm 140 that provides a pre-load. In this example, a mounting tab 142 is fixed to the housing 58 and the flex arm 140 extends from one end 144 fixed to the mounting tab 142 to a distal end 146 that abuts against an end face 148 of the motor sled 38.

The subject disclosure provides for an adjustment system and method that reduces movement of mechanical parts inside of headlamps that would affect the aiming system after initial settings have been achieved. A biasing member provides pre-load into the assembly. This increases headlamp aim capability and stability, and can be easily tuned for each lamp assembly. The increased headlamp aim stability and capability is achieved by reducing ability for internal mechanisms to shift in place due to actions such as hood slam and motor actuation. This also allows for necessary moving parts and linkages to maintain their own tolerances to prevent binding. Pre-load is added onto moving parts and screw adjusters to bias and hold parts in one direction to prevent them from shifting back and forth, while still maintaining capability for movement. The use of a pre-load member also helps to dampen vibration, and reduces the effect of thermal cycling, high input loads, and vibration on headlamp aim drop.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly comprising:
   a housing;
   a vehicle lamp assembly supported by the housing;
   a motor sled supported for movement relative to the housing;
   an adjustment member coupled to the motor sled, wherein the motor sled is moveable by the adjustment member to adjust an aim of the vehicle lamp assembly; and a biasing member reacting between the motor sled and the housing.

2. The assembly of claim 1, wherein the biasing member generates a preload force to bias the motor sled away from the housing.

3. The assembly of claim 1, wherein the biasing member comprises a coil spring.

4. The assembly of claim 3, wherein the motor sled comprises a main body with a first arm extending outwardly of the main body to provide a first spring base, and wherein the housing includes a second arm extending outwardly of the housing toward the first arm to provide a second spring base.

5. The assembly of claim 3, including a first mounting tab fixed to the motor sled and a second mounting tab fixed to the housing, and wherein the coil spring includes a first spring end fixed to the first mounting tab and a second spring end fixed to the second mounting tab.

6. The assembly of claim 1, wherein the biasing member comprises a flex arm.

7. The assembly of claim 6, wherein the flex arm extends from one end fixed to the motor sled to a distal end that abuts against the housing.

8. The assembly of claim 7, wherein the housing includes a guide channel that receives a portion of the motor sled, and wherein the distal end abuts directly against an open end face of the guide channel.

9. The assembly of claim 6, including a mounting tab fixed to the housing, and wherein the flex arm extends from one end fixed to the mounting tab to a distal end that abuts against an end face of the motor sled.

10. The assembly of claim 1, wherein the adjustment member comprises a drive screw that is coupled to the motor sled which is associated with a motor.

11. The assembly of claim 10, wherein the motor sled comprises a main body with a first arm extending outwardly of the main body to engage the drive screw, a slider portion extending along an edge of the main body to move within a guide channel formed within the housing, and a motor mount portion that is coupled to the motor.

12. The assembly of claim 11, wherein the motor sled includes a first interface and the housing includes a second interface, and wherein the biasing member extends from a first end associated with the first interface to a second end associated with the second interface.

13. The assembly of claim 12, wherein the biasing member comprises a spring.

14. The assembly of claim 12, wherein the biasing member comprises a flex arm.

15. The assembly of claim 1, wherein the biasing member is separate from the adjustment member and/or the biasing member is non-coaxial with the adjustment member.

16. A method comprising:
supporting a vehicle lamp assembly with a housing;
supporting a motor sled for movement relative to the housing;
coupling an adjustment member coupled to the motor sled, wherein the motor sled is moveable by the adjustment member to adjust an aim of the vehicle lamp assembly; and
installing a biasing member to react between the motor sled and the housing.

17. The method of claim 16, including generating a preload force with the biasing member to bias the motor sled away from the housing.

18. The method of claim 16, including forming the motor sled to comprise a main body with a first arm extending outwardly of the main body to engage the adjustment member, a slider portion extending along an edge of the main body to move within a guide channel formed within the housing, and a motor mount portion that is coupled to a motor.

19. The method of claim 18, including providing the motor sled with a first interface and the housing with a second interface, and extending the biasing member from a first end associated with the first interface to a second end associated with the second interface.

20. The method of claim 19, wherein the biasing member comprises a spring.

21. The method of claim 19, wherein the biasing member comprises a flex arm.

22. The method of claim 16, wherein the biasing member is separate from the adjustment member and/or the biasing member is non-coaxial with the adjustment member.

* * * * *